Feb. 21, 1933.  M. W. McCONKEY  1,898,306
BRAKE OPERATING MECHANISM
Filed Feb. 18, 1928  2 Sheets-Sheet 1
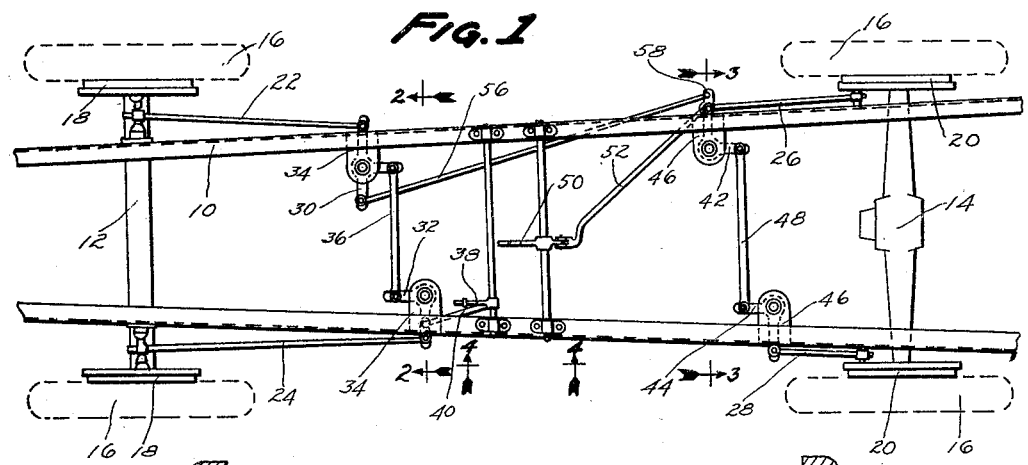
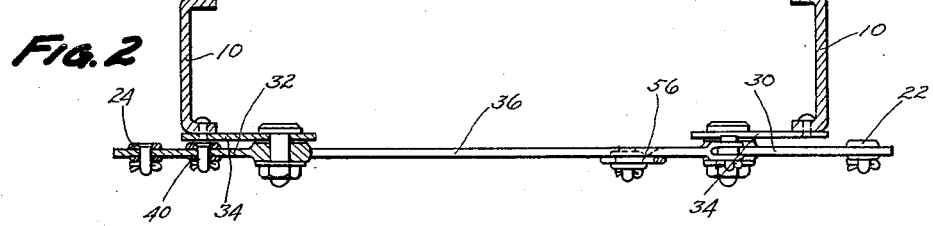
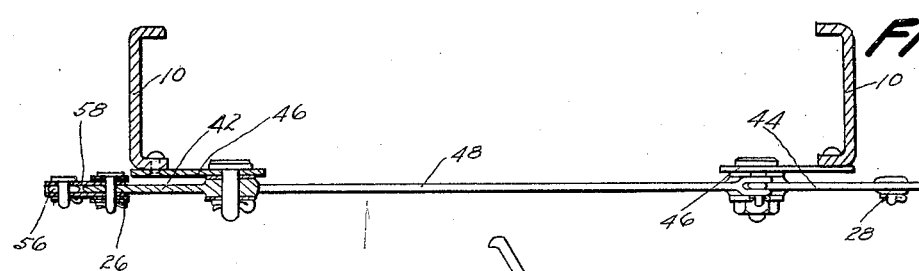
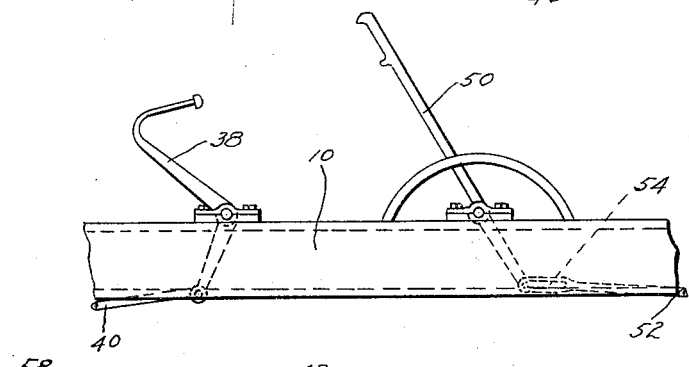
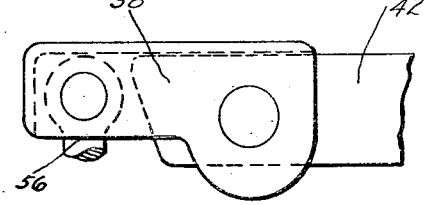
INVENTOR
Montgomery W. McConkey

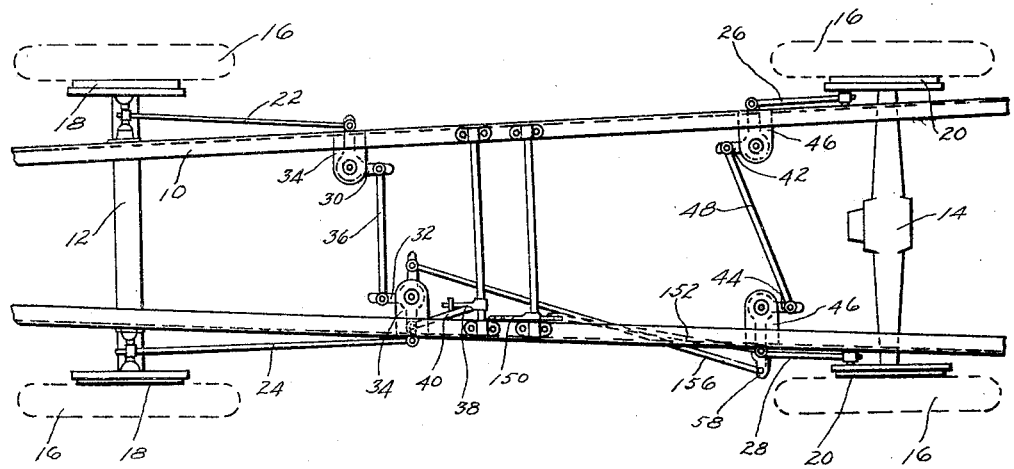

Patented Feb. 21, 1933

1,898,306

UNITED STATES PATENT OFFICE

MONTGOMERY W. McCONKEY, OF SOUTH BEND, INDIANA, ASSIGNOR TO BENDIX BRAKE COMPANY, OF SOUTH BEND, INDIANA, A CORPORATION OF ILLINOIS

BRAKE-OPERATING MECHANISM

Application filed February 18, 1928. Serial No. 255,209.

This invention relates to brakes, and is illustrated as embodied in novel operating mechanism for a set of four-wheel automobile brakes. An object of the invention is to provide an inexpensive but strong and efficient system of operating mechanism, by directly connecting the usual front and rear sets of pendulum or idler levers, suitably modified to permit such use, thereby eliminating the usual rockshafts.

Preferably the pedal or its equivalent operates all four of the brakes, while the hand lever or its equivalent only operates the two rear brakes, inasmuch as this permits the arrangement of the system with everything in tension.

From a somewhat different point of view, the arrangement may be regarded as giving a front brake system operated by the pedal and a rear brake system operated by the hand lever, the two systems being combined or connected so that in practice the pedal operates the rear brakes as well as the front, the front and rear systems nevertheless being entirely separate and independent in that either system may be completely destroyed or removed from the car without in any way affecting the operation of the remaining system.

The above and other objects and features of the invention, including various novel and desirable details in the construction and arrangement of the mechanism, will be apparent from the following description of the illustrative embodiments shown in the accompanying drawings, in which:

Figure 1 is a top plan view of an automobile chassis, showing one embodiment of the invention;

Figure 2 is a section on the line 2—2 of Figure 1, showing the connection between the front brake levers;

Figure 3 is a section on the line 3—3 of Figure 1, showing the connection between the rear brake levers;

Figure 4 is a partial elevation looking in the direction of the arrows 4—4 in Figure 1, and showing the pedal and hand lever connections;

Figure 5 is a detail view, showing on an enlarged scale in top plan the connection between the right rear lever and the tension rod from the right front lever;

Figure 6 is a top plan view corresponding to Figure 1, but showing an arrangement with the hand lever on the left side of the chassis instead of in the center; and Figure 7 is a similar view of another modification, with a different connection between the two rear brake levers.

In the arrangement of Figures 1–5, the chassis includes a frame 10, supported by the usual front and rear springs (not shown) on a front axle 12 and a rear axle 14. The axles are supported on road wheels 16 having front brakes 18 and rear brakes 20. The front brakes are operated by right and left rods or cables or other tension elements 22 and 24, while the rear brakes are operated by right and left rods or cables or other tension elements 26 and 28.

The front brake connections 22 and 24 are operated respectively by a three-arm bellcrank idler or pendulum lever 30 and by a two-arm lever 32, both mounted for movement in a substantially horizontal plane and mounted on brackets 34 carried by frame 10 adjacent the rear ends of the front springs. Levers 32 and 30 are interconnected by a rod or cable or other tension element 36 crossing the chassis in the space just behind the oil pan of the engine and just in front of the clutch housing.

The pedal 38, or an equivalent operating device, is in this arrangement connected by a rod or cable 40 to the lever 32. This gives a pedal-operated front brake system with all the connections in tension.

The rear brake connections 26 and 28 are operated by generally similar levers 42 and 44, both however being two-arm horizontal bellcrank levers. These levers are mounted on brackets 46 carried by frame 10 adjacent the front ends of the rear springs.

Levers 42 and 44 are connected by tension means such as a rod or cable 48 extending crosswise of the chassis, and are operated from the emergency hand lever 50, or an equivalent operating device, through a rod or cable 52, preferably having a slot 54 at one end so that the brakes may be applied from the pedal without disturbing the hand lever.

The above gives a rear brake system, with everything in tension, operated by the hand lever 50, and entirely separate from and independent of the front brake system, in that either system may be destroyed or removed from the car without in any way affecting the operation of the remaining system.

Preferably the two systems are connected or combined, by means such as a rod or cable 56 extending from the right front lever 30 to the right rear lever 42. In the illustrated arrangement, the connection 56 acts on a one-way connection 58 pivoted to lever 42, and channel-shaped in section and embracing the rear edge of the lever. Thus the operation of the front brakes also operates the rear brakes, but the operation of the rear brakes by the hand lever does not affect the front brakes.

It will be noted that both the connection 56 between the front and rear systems, and the connection 52 from the hand lever, are on the right side of the car, and that if all the connections are to be in tension it is necessary in this arrangement that these two connections should be on the same side of the car. Therefore, when the hand lever 150 is on the left, as in Figure 6, the connection 152 therefrom should extend to the left rear lever 44, instead of to the right rear lever 42, and moreover the connection 156 between the two systems should extend from the left front lever 32 to the left rear lever 44.

In Figure 7 is shown an arrangement suitable for use when the propeller shaft 60 moves through such a great vertical arc, due to the action of the rear springs, as to make the use of the direct transverse connection 48 impracticable. In this arrangement, a direction-changing element, such as a bellcrank lever 62, is arranged adjacent the front end of the propeller shaft 60, just above or below the propeller shaft, and is connected by rods or cables 64 and 66 to the levers 242 and 244, corresponding to levers 42 and 44. Lever 62 may be mounted on the transmission 68, or on a cross member of the chassis frame, or even on the torque tube surrounding the propeller shaft.

While several illustrative embodiments have been described in detail, it is not my intention to limit the scope of the invention to those particular embodiments, or otherwise than by the terms of the appended claims.

I claim:

1. A vehicle having, in combination, two front brakes, two rear brakes, a system of levers and lengthwise movable tension members pivotally interconnected arranged to operate the front brakes, a different system of levers and lengthwise movable tension members arranged to operate the rear brakes, and a connection through which the first system operates the second, the second system being independently operative without affecting the first system.

2. A vehicle having, in combination, two front brakes, two rear brakes, a lever arranged to operate each of the four brakes, a tension connection between the two levers for the front brakes, a tension connection between the two levers for the rear brakes, and a connection between one front brake lever and one rear brake lever.

3. A vehicle having, in combination, two front brakes, two rear brakes, a lever arranged to operate each of the four brakes, a lengthwise movable tension connection between the two levers for the front brakes, a lengthwise movable tension connection between the two levers for the rear brakes, and a connection through which one front brake lever operates one rear brake lever but without being operated by said rear brake lever.

4. A vehicle having, in combination, two front brakes, two rear brakes, a lever arranged to operate each of the four brakes, a tension connection between the two levers for the front brakes, a tension connection between the two levers for the rear brakes, and a connection between one front brake lever and one rear brake lever, together with a first operating device connected to one front brake lever and a different operating device connected to one rear brake lever.

5. A vehicle having, in combination with a frame supported by front and rear springs, four brakes and four levers separately mounted on the vehicle and pivotally connected thereto for operating the respective brakes, said levers being connected in pairs, one pair being pivoted on the frame adjacent the rear ends of the front springs and the other pair being pivoted on the frame adjacent the front ends of the rear springs, together with a connection between said pairs.

6. A vehicle including a frame having, in combination, four brakes and four levers having individual pivotal mountings on the frame for operating the respective brakes, said levers being connected in pairs, together with one operating device arranged to operate one of said pairs of levers and a different operating device arranged to operate the other of said pairs.

7. A vehicle having, in combination, four brakes and four levers operating the respective brakes, said levers being connected in pairs by lengthwise movable tension connections, together with one operating device arranged to operate one of said pairs of levers and a different operating device arranged to operate both of said pairs of levers.

8. A vehicle having, in combination with a chassis frame, four brakes, and four horizontally moving levers pivoted on said frame and respectively operating the several brakes and which are directly connected by a system of tension elements moved lengthwise in applying the brakes.

9. A vehicle including a frame having, in combination, right and left rear brakes and interconnected right and left levers operating the corresponding rear brakes, right and left front brakes and interconnected right and left levers operating the corresponding front brakes, each of said levers being separately mounted on the vehicle frame and operating mechanism acting through said levers to apply the brakes.

10. A vehicle having, in combination, right and left rear brakes and interconnected right and left levers operating the corresponding rear brakes, said levers being rotatable in the same plane right and left front brakes and interconnected right and left levers operating the corresponding front brakes, an operating device connected to one of the front brake levers, and another operating device connected to one of the rear brake levers.

11. A vehicle having, in combination, right and left rear brakes and interconnected right and left levers operating the corresponding rear brakes, said levers being rotatable about spaced parallel axes right and left front brakes and interconnected right and left levers operating the corresponding front brakes, an operating device connected to one of the front brake levers, another operating device connected to one of the rear brake levers, and a connection between one of the front brake levers and one of the rear brake levers.

12. A vehicle having, in combination, right and left rear brakes and interconnected right and left levers operating the corresponding rear brakes, right and left front brakes and interconnected right and left levers operating the corresponding front brakes all of said levers being rotatable about axes having spaced relation with each other, an operating device connected to one of the front brake levers, another operating device connected to the right rear brake lever, and a connection between the right front brake lever and the right rear brake lever.

13. A vehicle having a propeller shaft, and also having, in combination, right and left rear brakes and interconnected right and left rear levers operating the corresponding rear brakes, right and left front brakes and interconnected right and left front levers operating the corresponding front brakes, and operating means acting on said levers to apply the brakes, the right and left rear levers being interconnected by means passing adjacent the front end of the propeller shaft, said means including a bell crank pivotally mounted on the vehicle.

14. A vehicle having a propeller shaft, and also having, in combination, right and left rear brakes and interconnected right and left rear levers operating the corresponding rear brakes, right and left front brakes and interconnected right and left front levers operating the corresponding front brakes, a connection between one front and one rear lever, an applying device connected to one front lever, and a different applying device connected to one rear lever, the right and left rear levers being interconnected by means extending from one lever forwardly to a point adjacent the front end of the propeller shaft, and from there rearwardly to the other lever.

15. A vehicle having a propeller shaft, and also having, in combination, right and left rear brakes and interconnected right and left rear levers operating the corresponding rear brakes, right and left front brakes and interconnected right and left front levers operating the corresponding front brakes, and operating means acting on said levers to apply the brakes, the right and left rear levers being interconnected by means including a fifth lever pivotally mounted on the vehicle adjacent the front end of the propeller shaft.

16. A vehicle having a propeller shaft and also having, in combination, at least one brake adjacent each side of the vehicle, a lever adjacent each side of the vehicle connected to operate the corresponding brake, an applying device connected to one of said levers, and connections between the two said levers including another lever pivotally mounted on the vehicle adjacent the front end of the propeller shaft.

17. A vehicle having a propeller shaft and also having, in combination, at least one brake adjacent each side of the vehicle, a lever adjacent each side of the vehicle connected to operate the corresponding brake, an applying device connected to one of said levers, and connections between the two said levers including a direction-changing element mounted adjacent the front end of the propeller shaft.

In testimony whereof I have hereunto signed my name.

MONTGOMERY W. McCONKEY.